(12) United States Patent
Losfeld et al.

(10) Patent No.: US 7,045,219 B2
(45) Date of Patent: May 16, 2006

(54) SHORT METAL FIBERS

(75) Inventors: Ronny Losfeld, Waregem (BE); Lieven Anaf, Waregem (BE)

(73) Assignee: N.V. Bekaert S.A., Zwevegem (BE)

( * ) Notice: Subject to any disclaimer, the term of this patent is extended or adjusted under 35 U.S.C. 154(b) by 233 days.

(21) Appl. No.: 10/450,139

(22) PCT Filed: Dec. 10, 2001

(86) PCT No.: PCT/EP01/14648

§ 371 (c)(1),
(2), (4) Date: Jun. 12, 2003

(87) PCT Pub. No.: WO02/057035

PCT Pub. Date: Jul. 25, 2002

(65) Prior Publication Data

US 2004/0062925 A1    Apr. 1, 2004

(30) Foreign Application Priority Data

Dec. 13, 2000 (EP) .................................. 00204497

(51) Int. Cl.
B32B 5/02    (2006.01)
B32B 3/24    (2006.01)
C22C 49/14   (2006.01)
C22C 47/00   (2006.01)
C22C 111/00  (2006.01)

(52) U.S. Cl. ................... 428/606; 428/605; 428/292.1; 428/311.11; 428/312.2; 29/4.53; 95/273; 95/288; 210/184; 210/348; 502/439; 164/6; 165/907

(58) Field of Classification Search ................ 428/606, 428/605, 292.1, 311.11, 312.2; 19/145.7, 19/98; 29/4.53; 419/24, 2, 33; 95/273, 95/288; 210/184, 348; 502/439; 164/6; 165/907
See application file for complete search history.

(56) References Cited

U.S. PATENT DOCUMENTS 3,469,297 A     9/1969  Webber
3,670,485 A  *  6/1972  Brown et al. ................. 57/327
4,703,898 A    11/1987  Nakagawa et al.
4,764,488 A  *  8/1988  Saito et al. ................ 501/95.2
4,776,885 A  * 10/1988  Nakagawa et al. ........... 75/229
5,294,387 A  *  3/1994  Nakano et al. ........... 156/89.26
6,864,199 B1 *  3/2005  Doza et al. ................ 501/95.1

FOREIGN PATENT DOCUMENTS

GB         889583      2/1962

(Continued)

OTHER PUBLICATIONS

KR 2003067251 A Patent Abstract, Shin, Metal Fiber Filter Production, Aug. 2003.*

(Continued)

*Primary Examiner*—Deborah Jones
*Assistant Examiner*—Jason Savage
(74) *Attorney, Agent, or Firm*—Foley & Lardner LLP

(57) ABSTRACT

The present invention relates to short metal fibers. A set of short metal fibers, with an equivalent diameter ranging from 1 to 150 $\mu m$, comprises entangled and curved fibers. At least 10% of the short metal fibers are entangled, whereas the length of the curved fibers is distributed according to a gamma-distribution, having an average length preferably between 10 and 2000 $\mu m$.

29 Claims, 6 Drawing Sheets

FOREIGN PATENT DOCUMENTS

| | | |
|---|---|---|
| JP | 2-175803 A | 7/1990 |
| JP | 02178336 A * | 7/1990 |
| JP | 09324324 A * | 12/1997 |
| WO | WO 96/08302 A2 | 3/1996 |
| WO | WO 97/04152 A1 | 2/1997 |
| WO | WO 98/31491 A1 | 7/1998 |

OTHER PUBLICATIONS

KR 335749 B Patent Abstract, Jun et al, Method for Manufacturing Metal Fiber Sinteer. May 2002.*

* cited by examiner

SHORT METAL FIBERS

FIELD OF THE INVENTION

The invention relates to short metal fibers and to a sintered metal fiber product, using such fibers. The invention further relates to a method to produce short metal fibers and a sintered metal fiber product, using such fibers.

BACKGROUND OF THE INVENTION

Metal fibers having a rather flat cross section, with diameter less than 15 µm and a length of less than 400 µm are known from U.S. Pat. No. 4,703,898. These fibers have a crescent shape and have a small, point-like hook at both ends. This document further provides a method to produce such fibers.

JP2175803 describes similar short metal fibers, which have a curved shape.

Short metal fibers are also known from GB889583. These metal fibers may be undulated or "kinked" over their length. In this document, these terms mean that the major axis of the fibers change two or more times over the length of the fiber.

SUMMARY OF THE INVENTION

Most known short metal fibers are rather difficult to pour homogeneously in a mould, providing identical properties throughout the whole mould volume such as density and sizes of open space between adjacent fibers, although lots of improvements have been suggested.

The present invention relates to an alternative set of short metal fibers, which have an improved pourability. Further, the invention relates to sintered short metal fiber products and to a method to provide short metal fibers and sintered short metal fiber products.

A set of short metal fibers used to provide the temperature resistant material as subject of the invention is characterized by the presence of two different groups of short metal fibers, being "entangled" fibers and "curved" fibers.

A set of short metal fibers as subject of the invention comprises short metal fibers with an equivalent diameter "D" between 1 and 150 µm preferably between 2 and 100. Most preferably the equivalent diameter ranges between 2 and 50 µm or even between 2 and 35 µm such as 2, 4, 6.5, 8, 12 or 22 µm.

With the term "equivalent diameter" is meant the diameter of an imaginary circle, which has the same surface as the surface of a fiber, cut perpendicular to the major axis of the fiber.

The set of short metal fibers comprises entangled fibers. The number of entangled fibers in a set of short metal fibers as subject of the invention ranges from 5 to 35%. Preferably more than 10% of all short metal fibers in the set of short metal fibers are entangled. These fibers are hereafter referred to as "entangled fibers". To have a statistically reliable percentage, a sample of at least 50 fibers, randomly chosen out of the set of short metal fibers are to be evaluated.

The percentage of entangled fibers is measured and calculated as:

% entangled fibers=100×(#entangled/#total)

wherein entangled=number of entangled fibers out of the sample;
total=number of fibers out of the sample.

The entangled fibers of the set of short metal fibers as subject of the invention have an average length "Le", which is considerably longer as the average length of the curved fibers "Lc". The average length of the entangled fibers is at least 5 times the average length of the curved fibers. Preferably, the average length of the entangled fibers is more than 10 times the average length of the curved fibers. Preferably, the average length of the entangled fibers is larger than 200 µm, or even more than 300 µm, most preferably more than 1000 µm. the entangled fibers may be entangled with themselves (individually) or may be entangled together with some other entangled fibers. The entangled fibers, either individually or together with other entangled fibers, cannot be individualized as an essentially straight fiber out of the shape which is defined by the entanglement of the fibers. The major axis of each fiber changes so often and unpredictably, that the fiber may be entangled in many different ways. Some of the fibers are present in a shape, which resembles to a clew. The effect is comparable to the so-called pilling effect, well known in the textile industry, and in carpet industry more in particular. One or more fibers get trapped into a small ball. The trapped fibers may not be separated from this ball anymore. Other fibers look more like a pigtail. The are characterized by a major axis which changes several times in an unpredictable way, so a relatively chaotic shape may be provided.

The other short metal fibers out of the set of short metal fibers are hereafter referred to as "curved" fibers The average length "Lc" of the curved fibers of the set of short metal fibers may range from 10 to 2000 µm, preferably from 30 to 1000 µm such as 100µm, 200 µm or 300 µm. When a length distribution is measured from these curved fibers as part of a set of short metal fibers as subject of the invention, a gamma-distribution is obtained. This gamma-distribution is identified by an average length Lc and a shape factor "S". According to the present invention, the gamma-distribution of the length of the curved fibers, has a shape factor S ranging between 1 and 10.

For average lengths Lc larger than 1000 µm, usually a shape factor S lager than 5 is measured. For average lengths Lc between 300 µm and 1000 µm, a shape factor S between 2 and 6 is usually measured. For average lengths Lc smaller than 300 µm, usually a shape factor S smaller than 3 is measured. To have a statistically reliable distribution, at least 50 curved fibers, randomly chosen out of the set of short metal fibers are to be measured.

The L/D ratio of a set of short metal fibers as subject of the invention has an L/D-ratio of more than 5, preferably more than 10, wherein L is the average length of all fibers, present in a representative sample of fibers from the set of short metal fibers. As described above, this sample comprises at least 50 fibers out of the set of short metal fibers. Preferably, but not necessarily, the curved fibers out of a set of short metal fibers as subject of the invention has an Lc/D-ratio of more than 5, preferably more than 10.

Further, a majority of these curved fibers have a major axis, which changes over an angle of at least 90°. This angle is the largest angle, which can be measured between two tangents of this major axis. Preferably, 40% of the curved fibers has a major axis, changing more than 90°, e.g. more than 45%, or preferably more than 50%. To measure these curves of the major axis, a microscopic image with appropriate enlargement is taken from several short metal fibers. Using a computer imaging system, the tangents of the major axis and the largest angle between them is calculated. To have a statistically reliable sample, at least 50 curved fibers, randomly chosen out of the set of short metal fibers are to be measured.

Such a set of short metal fibers has several advantages. A set of short metal fibers as subject of the invention has good pouring behavior.

Further, when short metal fibers as subject of the invention are poured, e.g. in a specific three-dimensional mould or on a flat surface, numerous contact points can be noticed between the short metal fibers. They are, so to say, ready to be sintered without a major force which is normally to be applied before sintering. The amount of contact points is present without requiring a force, which is not the case when the diameter of the short metal fibers extends beyond 150 µm. One understands that, if necessary to increase even more the number of contact points, or to decrease the pore volume and/or size, such forces may be applied before or during further processing.

Once poured, a set of short metal fibers as subject of the invention has an apparent density in the range of 10 to 40%, according to ISO787-11. The pores between the short metal fibers are very small, but the number of pores is sufficiently large to provide an apparent density which is typically between 10 and 40%. A porosity, calculated as indicated below, ranges between 60 and 90%.

Porosity (%)=100%–apparent density (%)

The volumes between the fibers are similar throughout the poured volume, so providing an isotropic volume.

Short metal fibers as subject of the invention may be obtained by a method comprising the following steps:
  individualizing the metal fibers by a carding operation;
  providing the set of short metal fibers by cutting or entangling and sieving the set of short metal fibers, preferably by using a comminuting machine.

First, metal fibers, being present in a bundle of fibers, in a yarn or a textile structure, or even as staple fibers, are individualized to some extend by a carding operation.

These more or less individualized fibers are brought into a comminuting device. In this device, each fiber is cut into short metal fibers by fast rotating knives. The blade of these knifes, having a certain blade thickness, encounter or 'hit' the fibers usually in radial direction. The fibers are mechanically plastically deformed and entangled or possibly broken into a smaller length. Due to the centrifugal force, the so provided short metal fibers (curved or entangled) are blown outwardly against the external wall of the comminuting device. This external wall comprises a sieve with well-defined openings. According to these openings, short metal fibers with a certain length may pass through the sieve, whereas too long short metal fibers will stay in the comminuting device and possibly be hit once again, until the lengths are sufficiently small to pass the sieve, or until they are entangled enough to allow passage through the sieve.

The alloy of the metal fibers is to be chosen in order to provide required properties such as temperature resistance or electrical conductivity. Stainless steel fibers out of AISI 300-type alloys, e.g. AISI 316L or fibers based on INCONEL®-type alloys such as INCONEL®601 or NICROFER®-type alloys such as NICROFER® 5923 (hMo Alloy 59) and NICROFER 6023, or fibers based on Fe—Cr—Al alloys may be used. Also Ni-fibers, Ti-fibers, Al-fibers, Cu-fibers or fibers out of Cu-alloy or other alloys may be used.

Metal fibers may e.g. be bundle drawn or shaved, or provided by any other process as known in the art.

The short metal fibers as subject of the invention may be used to provide a sintered product. The method of manufacturing a sintered product comprises the steps of:
  providing a set of short metal fibers;
  pouring said set of short metal fibers into a three-dimensional mould or on an essentially plane surface;
  sintering said set of short metal fibers to form a sintered product.

Possibly, before the sintering, the short metal fibers are pressed together to improve the coherency and/or to change the density.

Alternatively, the short metal fibers are brought in a suspension, using an appropriate agent or a mixture of appropriate agents.

The suspension is brought into a mould or poured onto an essentially plane surface. In a subsequent step the suspension liquid is removed, e.g. evaporated or sucked out. The mould, comprising the short fibers is then subjected to a sintering process in which all non-metal fiber elements are removed and in which a sintering between the metal fibers is obtained.

The sintering conditions are dependent upon the alloy and the properties required by the short metal fibers and the final sintered metal fiber product.

A great advantage of the method of the present invention is that the set of short metal fibers can easily be poured homogeneously; resulting in isotropic properties over the whole volume of the sinter metal fibers product. For example the density and the sizes of the pores are homogeneous over the whole volume of the product.

Another advantage of sintered products according to the present invention is their high porosity.

As indicated above, the short metal fibers will arrange themselves providing a three dimensional fiber structure, with numerous small pores and numerous contact points. The pores are characterized by a relatively small size.

Applying forces on the short metal fibers during sintering may decrease pore size and porosity.

The porosity of a sintered product according to the invention is equal to the porosity of the poured fibers, as described above. The fibers do not have to be put under pressure to form a coherently sintered volume.

This means that the porosity ranges generally between 60 and 90%.

The porosity is for example 70, 80 or 85%.

However, dependent on the type and level of pressure, the porosity may be lowered to 49% if necessary, for example by cold isostatic pressing.

According to the specific use of the short metal fibers or the sintered metal fiber product, different metals and/or alloys may be used to provide the short metal fibers or the sintered metal fiber product.

Sintered short metal fiber products may have different shapes, according to the specific requirements of their application. Short metal fibers may be sintered into flat plates, rings, cylindrical or tube like shapes. Also more complex shapes such as monolithic structures may be obtained.

Sintered products may be used for different applications. They may be used as a filtering device, for example a filtering device to filter gases or liquids.

The alloy of the metal fibers may be chosen in order to provide the filtering device the required properties such as temperature resistance and chemical resistance. Consequently, the filtering device may be used for high temperature applications, for example for the filtration of hot gases or for the filtration of corrosive gases or liquids.

The filtering device may have any shape. Preferred shapes are flat plates, rings, or cylindrical or tube like shapes.

When a sintered product as subject of the invention is used as a filtering devices, especially after being isostatically pressed, such filtering device may have an absolute filter rating of 0.5 μm up to 20 μm. Usually, the absolute filter rating may range between ⅓ and ½ of the equivalent diameter of the short metal fibers used.

A filtering device according to the present invention can thus be used for microfiltration applications, for example for the filtration of air in clean labs or in product rooms of electronic components.

A sintered product according to the present invention is in particular suitable to filter diesel exhaust gases.

A product as subject of the present invention may also be used as a carrier for catalysts. Therefore, commercially available catalyst can be applied on a sintered product.

A sintered product on which a catalyst is applied, hereinafter referred to as the catalyst, can be used to treat exhaust gases such as exhaust gases from incinerators or diesel engines, thereby removing harmful substances, such as $NO_x$, $NH_3$, $CO$, dioxins, $O_3$.

The catalyst is characterised by a porous open structure and a high specific surface. At the same time it is characterised by a high strength. Since the sintered product may withstand high temperatures, the catalyst can be used at high operating temperatures.

All these features result in a catalyst having a high efficiency of catalytic conversion.

Furthermore, a sintered product according to the present invention may be used as a catalytic filter which combines particle and/or dust retention and catalytic conversion of harmful components.

A sintered product may also be used as heat exchanging device. e.g. in Stirling engines, where a sintered product may be mounted in the passage of the working fluid or gas. Such device is also referred to as heat recuperator. The sintered product is heated when the working fluid or gas passes from the hot to the cold chamber of the Stirling engine. Afterwards, the heat, captured in the sintered product is regenerated when the cold working fluid or gas passes again through the sintered product, while it flows back to the hot chamber of the Stirling engine.

A three-dimensional sintered product according to the present invention can also be used a porous mould, for example as a mould to form glass products such as windshield glass.

Surprisingly, another use of a set of short metal fibers as subject of the invention is found by blending a set of short metal fibers with a ceramic matrix or ceramic or high-temperature resistant glue. A blend of short metal fibers and ceramic matrix or ceramic or high temperature resistant glue, up to 15% or even 20% by weight of short metal fibers, seems to resist thermal expansions to a larger extend, compared to the pure ceramic or high temperature resistant glue, once the glue or matrix comprising short metal fibers are cured. A higher resistance to thermal cracks in the glue was obtained. Preferably, the set of short metal fibers represents at least 0.5% of weight of temperature resistant material. Positive results were obtained especially when a set of short metal fibers is used which comprises entangled and curved fibers of which more than 10% of the set of short metal fibers are individually entangled fibers.

Surprisingly, only a relatively small change in electrical conductivity was noticed when the amount of the set of short metal fibers is kept lower than 10% by weight of the temperature resistant material, e.g. in the range of 1% to 9.5%, in the mean time providing sufficient resistance to thermal shocks and cracks. Higher percentages by weight of a set of short metal fibers may be used, e.g. more than 15% or even more than 20% or 30%, however such percentages of weight are not absolutely necessary to obtain a sufficient resistance to thermal shocks.

This effect is not restricted to short metal fibers as subject of the invention, but was also noticed using other short metal fibers. However the presence of entangled fibers plays an important role for the improvement of the thermal shock resistance. On the other hand, the presence of the curved fibers provides better pourablity and mixing behavior into the ceramic matrix or glue.

Preferably, ceramic matrices or ceramic glues based on $SiO_2$, $Al_2O_3$, $ZrO_2$ and/or $MgO$ are used.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1A:
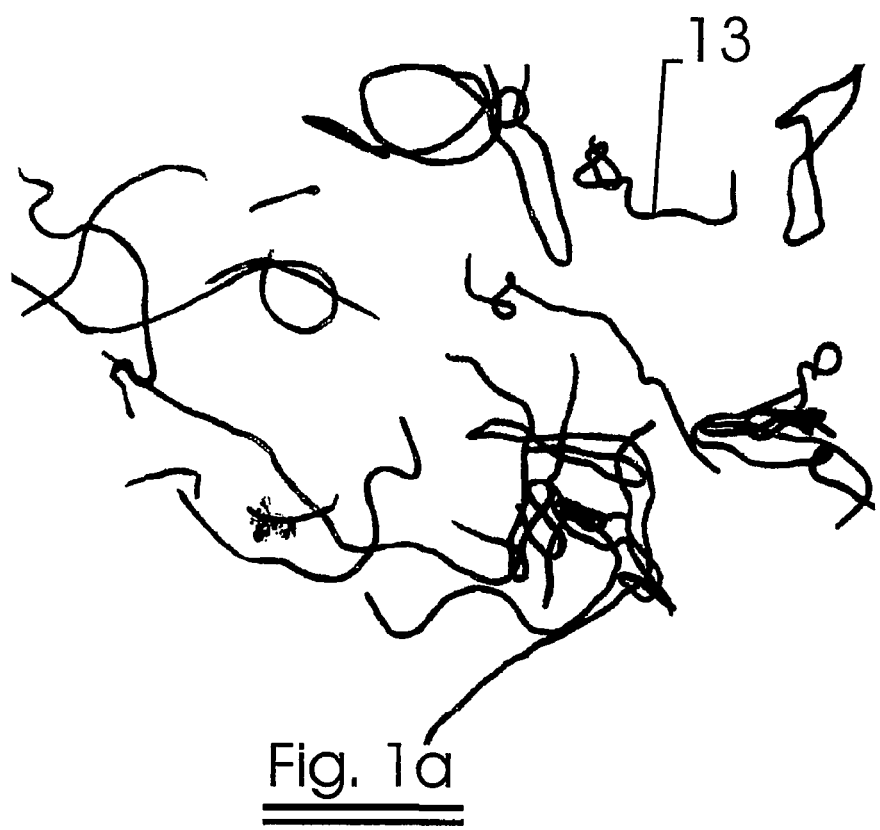
FIGS. 1A, 1B, 1C, 1D, 1E and 1F are images of short metal fibers, all being part of a set of short metal fibers as subject of the invention.
Figure 1B:
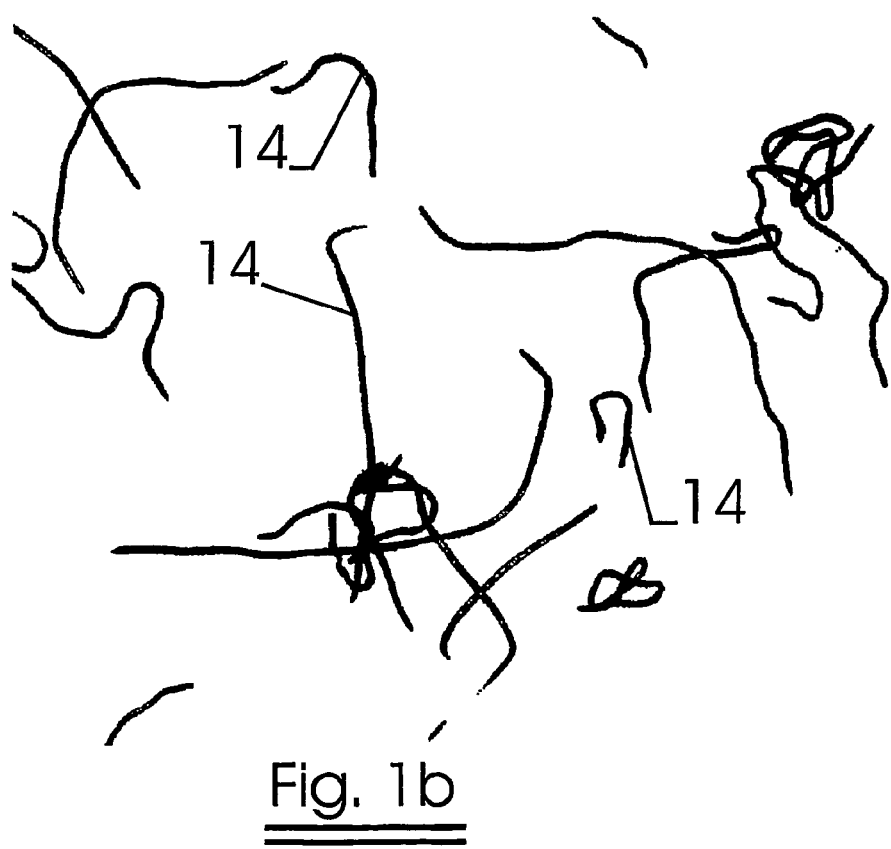
Figure 1C:
Figure 1D:
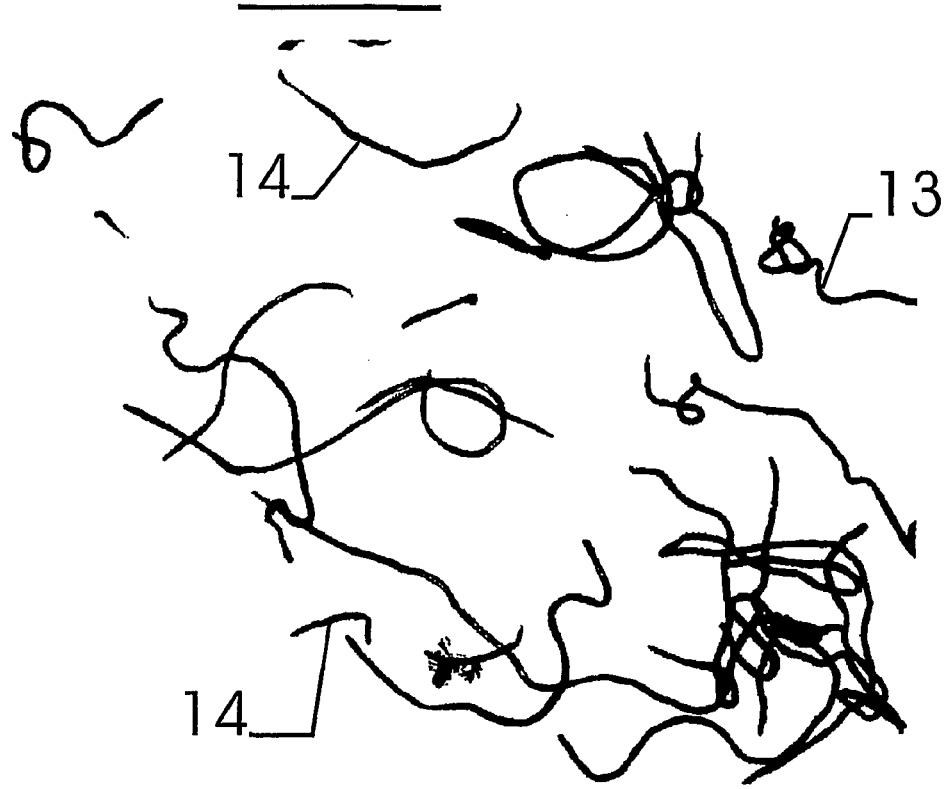
Figure 1E:
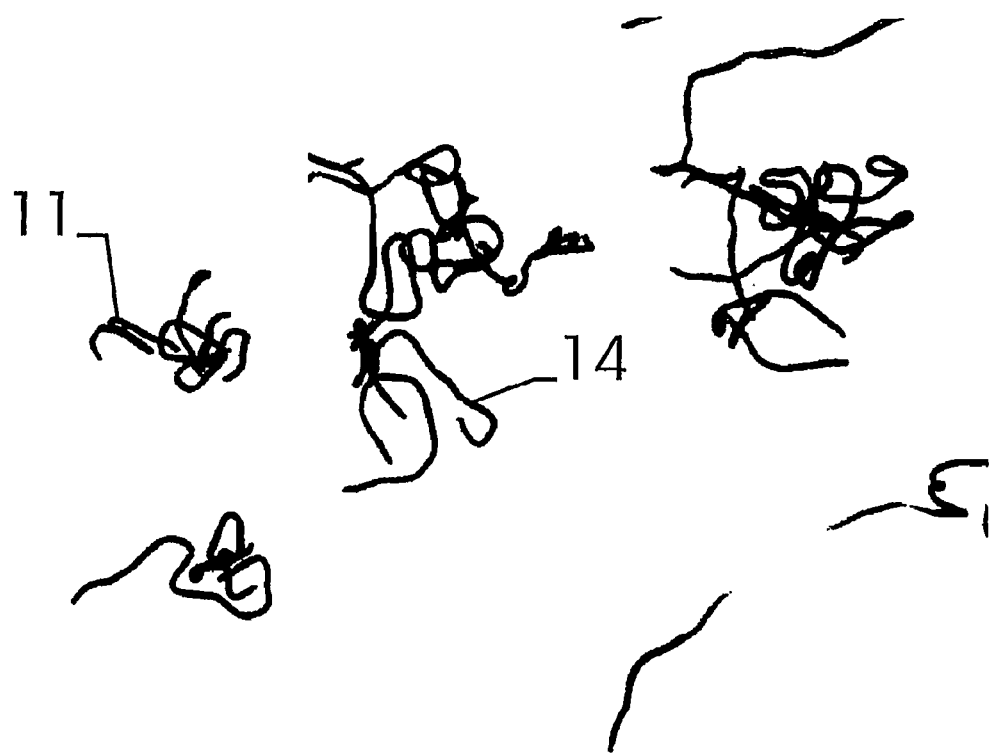
Figure 1F:
Figure 2:
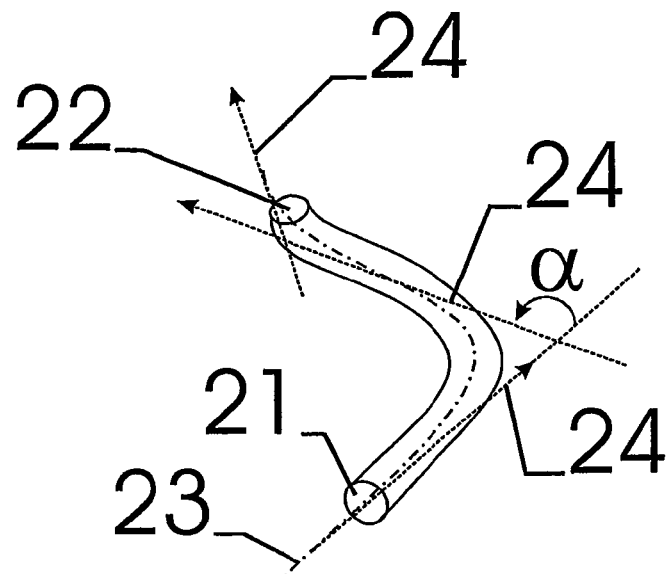
FIG. 2 shows a curved fiber being part of a set of short metal fibers as subject of the invention.

A preferred embodiment of a set of short metal fibers as subject of the invention is shown in FIGS. 1A, 1B, 1C, 1D, 1E and 1F, which all show short metal fibers out of the same set of short metal fibers as subject of the invention. The short metal fibers, having an equivalent diameter of 22 μm, are obtained by providing a bundle of AISI 316L bundle drawn fibers of a carding device and further to a comminuting device. As may be seen from FIGS. 1A to 1F, the shape of the short metal fibers may be very different. Some short metal fibers are clearly entangled fibers, such as fibers 11, 12 and 13. Fibers 12 are more curled irregularly, providing a non-defined shape. Fibers 13 are individually entangled to a non-defined shape. Fibers 11, 12 and 13 are to be understood as "entangled fibers". Other fibers 14 are clearly curved, although the curling angles are unpredictably. Some fibers, such as fiber 15, may have a limited curvature. An example of such a curved fiber is shown schematically in FIG. 2. A curved fiber has two ends, being a first end 21 and a second end 22. A major axis 23 connects the center of the transversal cuts over the whole length of the fiber. The direction of the major axis 23 changes over an angle α. Angle α is absolute value of the largest angle which can be measured between two vectors 24 having a direction equal to the tangent of the major axis, starting point being a point of the major axis, and a sense pointing from first end 21 to second end 22.

Figure 3:
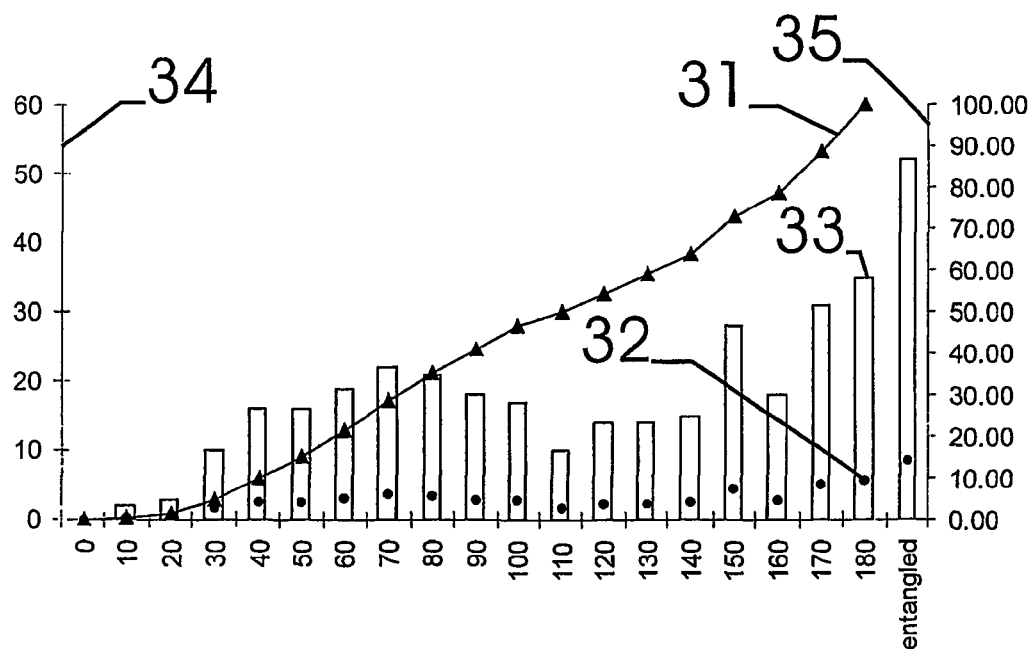
FIG. 3 shows a graph of the length distribution of a set of short metal fibers as subject of the invention.

FIG. 3 shows the angle distribution of the change of major axis of the curved fibers of the set of short metal fibers from FIGS. 1A to 1F. A sample to 316 fibers, randomly chosen out of the total set of short metal fibers was taken. Each bar 33 in the graph represents the number of fibers (to be read at the left ordinate 34), having a major axis changing with an angle α, α being smaller than the angle value underneath the bar, which is related to that bar, but larger than the angle, related to the bar at its left side. E.g. the bar related to 90°, indicates the number of curved fibers, having an angle α smaller than 90°, but larger than 80°. Related numbers are summarized in Table I

TABLE I

| angel α of fibers | number in sample | % curved with angle α/total curved fibers | % curved with angle α or entangled/total fibers |
|---|---|---|---|
| 0 | 0 | 0.00 | 0.00 |
| 10 | 2 | 0.65 | 0.55 |
| 20 | 3 | 0.97 | 0.83 |
| 30 | 10 | 3.24 | 2.77 |
| 40 | 16 | 5.18 | 4.43 |
| 50 | 16 | 5.18 | 4.43 |
| 60 | 19 | 6.15 | 5.26 |
| 70 | 22 | 7.12 | 6.09 |
| 80 | 21 | 6.80 | 5.82 |
| 90 | 18 | 5.83 | 4.99 |
| 100 | 17 | 5.50 | 4.71 |
| 110 | 10 | 3.24 | 2.77 |
| 120 | 14 | 4.53 | 3.88 |
| 130 | 14 | 4.53 | 3.88 |
| 140 | 15 | 4.85 | 4.16 |
| 150 | 28 | 9.06 | 7.76 |
| 160 | 18 | 5.83 | 4.99 |
| 170 | 31 | 10.03 | 8.59 |
| 180 | 35 | 11.33 | 9.70 |
| entangled | 52 | — | 14.40 |
| total entangled | 52 | | |
| total curved | 309 | | |
| total | 361 | | |

Line 31 indicates the cumulative curve of the number of curved fibers having an angle α, less than the angle value in abscissa. This number is expressed, as indicated on the right ordinate 35, in percentage compared to the total number of curved fibers in the sample. More than 50% of the curved fibers have a major axis direction changing more than 90°.

As also indicated in FIG. 3, more than 10% of all short metal fibers out of the set of short metal fibers are entangled fibers. This is indicated by the dots 32, which represent the percentage of fibers, also to be read on the right ordinate 35, comprised in the related bar 33, compared to the total number of short metal fibers out of the sample taken from the set of short metal fibers.

Figure 4:
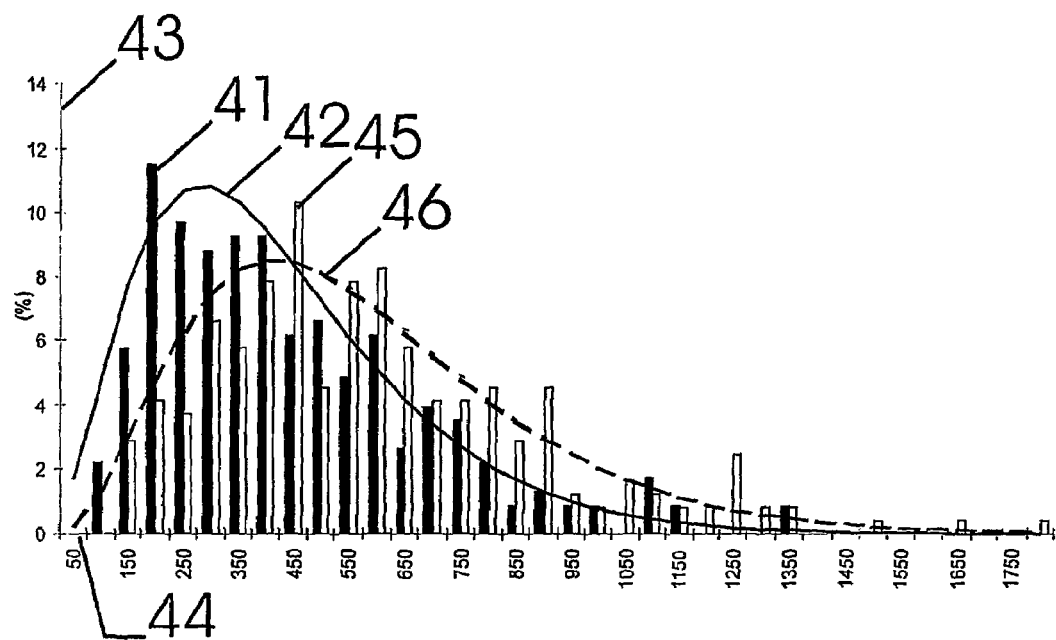
FIG. 4 shows a graph of the curvature distribution of the curved fibers out of a set of short metal fibers as subject of the invention.

FIG. 4 shows the length distribution of the curved fibers of two sets of short metal fibers as subject of the invention.

A first length distribution 41, indicated with black bars, is a length distribution of the curved fibers of a set of short metal fibers, having an equivalent diameter of 8 μm. The set of short metal fibers was provided using bundle drawn stainless steel fibers, alloy AISI 302. A representative and randomly chosen sample of 227 fibers was taken. An average length Lc of 420 μm was found. The length distribution is a gamma-distribution 42, being characterized with a shape factor S being 3.05. The bars of distribution 41 is to be understood as the percentage of curved fibers out of the sample (read in ordinate 43), which has a length (expressed in μm and indicated in abscissa 44) in the range with upper limit as indicated underneath the bar, and lower limit being the length indicated under the adjacent bar left if it. In the same way, the gamma-distribution reads the percentage of fibers in ordinate 43 in the range indicated on the abscissa 44 as explained above.

Another length distribution 45 is shown in FIG. 4, indicated with white bars, which is a length distribution of the curved fibers of a set of short metal fibers, having an equivalent diameter of 12 μm. The set of short metal fibers was provided using bundle drawn stainless steel fibers, alloy AISI 316L. A representative and randomly chosen sample of 242 fibers was taken. This length distribution accords to a gamma-distribution 46, which is characterized with a shape factor S being 3,72. An average length Lc of the curved fibers of 572 μm was measured.

Figure 5:
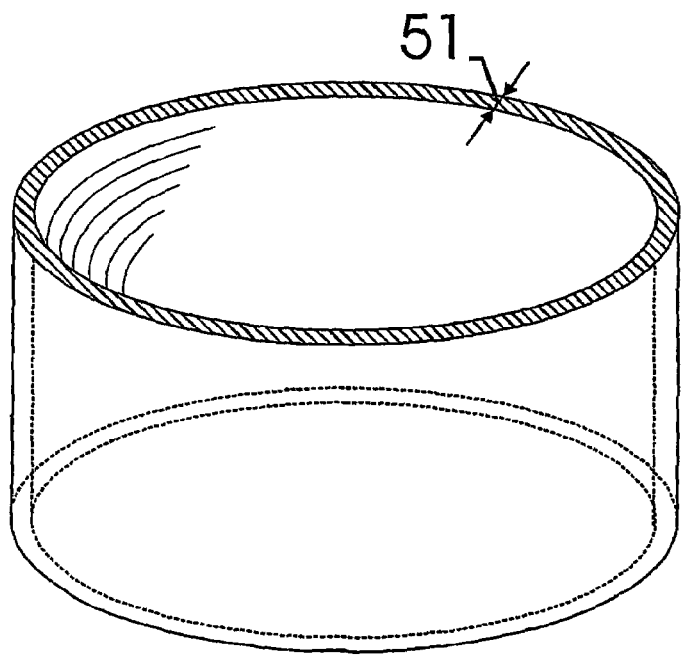
FIG. 5 shows a sintered metal fiber product as subject of the invention.

A sintered metal fiber product as subject of the invention may be provided as shown in FIG. 5. The short metal fibers used have a diameter of 22 μm. The thickness 51 of the medium is approximately 40 mm. The sintered metal fiber product has a porosity of 81%. The short metal fibers were stainless steel bundle drawn fibers, Fecralloy® type alloy. Such ring-like shape may be used as heat regenerating device in a Stirling engine. An alternative sintered metal fiber product, as subject of the invention is obtainable by sintering short metal fibers as subject of the invention to a flat shape, plate-like product. E.g. short metal fibers of alloy AISI 444, having an average length of 1000 μm and an equivalent diameter of 65 μm, obtained by a shaping process as explained in WO9704152, are sintered to a flat volume with thickness of 2.35 mm and a weight of 5226 g/m$^2$. A porosity of 72% and an absolute filter rating of 92 μm was obtained. When a similar product, using short metal fibers as subject of the invention, being bundle drawn fibers of an equivalent diameter of 12 μ and an average length L of 800 μm, isostatically pressed using 800 Bar, a porosity of 70% was obtained, and an absolute filter rating of 5.3 μm.

One understand that other shapes, such as flat plates, or tube-like or cylindrical shapes may be obtained. Even monolithic structures, e.g. to be used in a diesel exhaust filter, filtering soot from the exhaust gas, may be obtained.

Figure 6A:
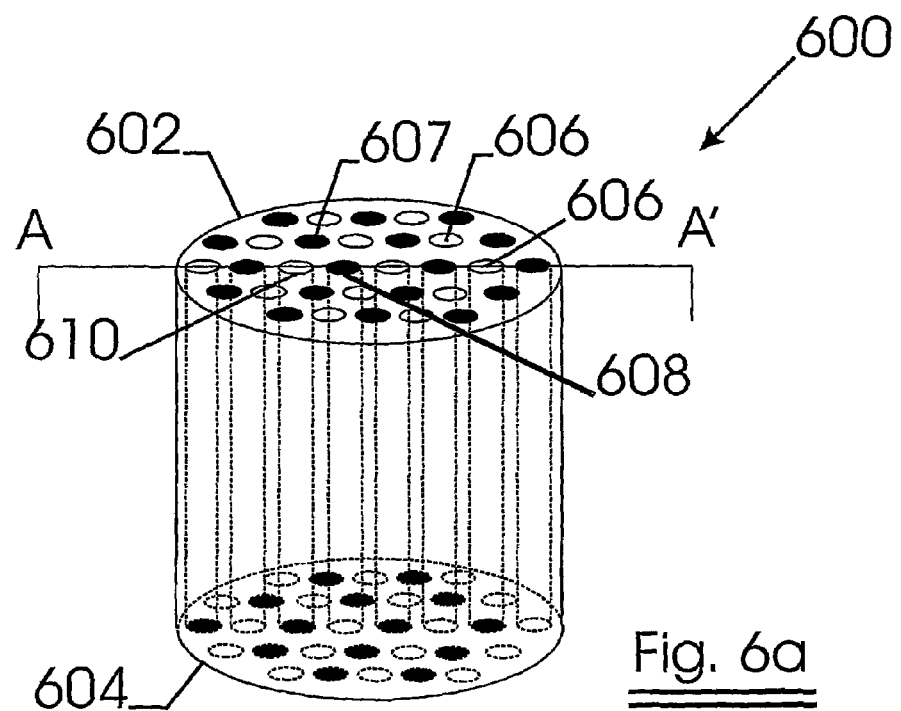
FIGS. 6a and 6b show a sintered product having a monolithic structure.
Figure 6B:
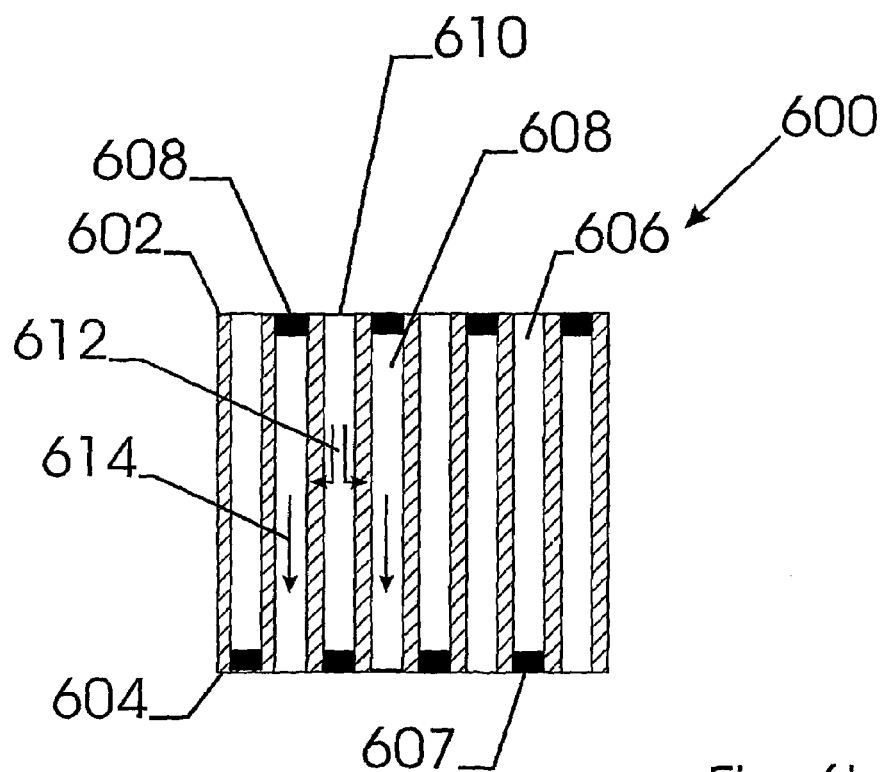

FIG. 6a shows a monolithic structure 600 comprising a set of short metal fibers. FIG. 6b shows a cross-section along line A–A'.

The monolithic structure shown in FIG. 6 is in particular suitable to filter exhaust gases.

The gas to be filtered enters the monolithic structure at inlet side 602 and exits the monolithic structure at outlet side 604.

The monolithic structure has a number of cells 606. Each cell has a first end adjacent the inlet of the monolithic structure and a second end adjacent the outlet of the monolithic structure.

At least part of the cells is blocked at the second ends of the cell by a barrier 607. The barrier comprises a material that does not allow the passage of the gaseous stream.

In the preferred embodiment of FIG. 6 a cell is either blocked at its inlet side as for example cell 608; or at its outlet side as for example cell 610. Thus, the exhaust stream can not pass freely through the cells, but is obliged to pass through the walls to a neighbouring cell having an open outlet side.

For example exhaust gas entering cell 610 passes through the wall surrounding cell 610, as indicated by the arrows 612, for example to cell 608 through which it can leave the monolithic structure at the outlet side.

Possibly, the cell walls are coated with a catalyst or alternatively a catalyst is applied into the porous structure of the monolithic structure.

A three-dimensional sintered product according to the present invention can also be used a porous mould, for example as a mould to form glass products such as windshield glass.

A set of short metal fibers as of FIG. 3, was used to improve the resistance to thermal cracking and thermal shocks of a $ZrO_2$—MgO based ceramic glue.

A ceramic material, being a ceramic past, which may be used as ceramic glue, was prepared using 77 gram $ZrO_2$—MgO based compound and 10 gram of water. An amount of a set of short metal fibers having an average equivalent diameter of 22 μm, of which the length distribution is provided as indicated with 45 in FIG. 4, is mixed in this ceramic paste, as indicated in Table I.

The ceramic paste was heated to a temperature of 600° C., and this temperature was kept for 90 sec. after which it was cooled to ambient in 60 sec. The number of cracks on an equal surface was counted, and is resumed in Table II.

TABLE II

| Temperature resistant matrix (ceramic matrix) (gram) | Set of short metal fibers of 12 μm (gram) | % of weight of short metal fibers (%) | Number of cracks (−) |
| --- | --- | --- | --- |
| 77 | 0 | 0 | 20 |
| 77 | 2 | 2.5 | 16 |
| 77 | 4 | 4.9 | 8 |
| 77 | 8 (sample I) | 9.4 | 0 |
| 77 | 8 (sample II) | 9.4 | 2 |

An identical result was obtained using a set of short metal fibers of 22 μm equivalent diameter.

The invention claimed is:

1. A set of short metal fibers, said fibers having an equivalent diameter D in the range of 1 to 150 μm, wherein said set of short metal fibers comprises curved fibers and entangled fibers, said curved fibers having an average length Lc in the range of 10 to 2000 μm, said entangled fibers having an average length Le, said Le being more than 5 times Lc, wherein at least some of said entangled fibers have a major axis which changes several times in a non-uniform manner.

2. A set of short metal fibers as in claim 1, wherein lengths of said curved fibers are distributed according to a gamma-distribution.

3. A set of short metal fibers as in claim 1, wherein at least 10% of said short metal fibers are entangled fibers.

4. A set of short metal fibers as in claim 1, L being an average length of fibers in said set of short metal fibers, wherein L/D is larger than 5.

5. A set of short metal fibers as in claim 1, wherein Lc/D is larger than 4.

6. A set of short metal fibers as in claim 1, said short metal fibers being stainless steel fibers.

7. A set of short metal fibers as in claim 1, said set of short metal fibers having an apparent density between 10 and 40%.

8. A set of short metal fibers as in claim 1, said curved fibers having a major axis, said major axis having a direction, said direction changing more than 90° for at least 40% of said curved fibers.

9. A set of short metal fibers as in claim 1, wherein at least some of said entangled fibers are individually entangled.

10. A set of short metal fibers as in claim 1, wherein at least some of said entangled fibers are mutually entangled.

11. A set of short metal fibers as in claim 1, wherein said entangled fibers are individually or mutually entangled.

12. A set of short metal fibers as in claim 1, wherein at least some of said entangled fibers are in a shape that resembles at least one of a clew and a pigtail.

13. A sintered product, comprising short metal fibers as in claim 1.

14. A sintered product as in claim 13, wherein said product has a porosity of more than 60%.

15. A sintered product as in claim 13, wherein said product has an absolute filter rating between 0.5 and 20 μm.

16. A sintered product as in claim 13, an absolute filter rating of said sintered product being between ⅓ and ½ of the equivalent diameter of said short metal fibers.

17. A method of manufacturing a sintered product according to claim 13, said method comprising the steps of:
providing a set of short metal fibers;
pouring said set of short metal fibers into a three-dimensional mould or on an essentially plane surface;
sintering said set of short metal fibers to form a sintered product according to claim 13.

18. A method according to claim 17, wherein said method further comprises the step of pressing said short metal fibers together before performing said sintering step.

19. A method of filter, comprising:
filtering a fluid with the sintered product of claim 13.

20. A method of filtering, comprising:
filtering diesel exhaust gas with the sintered product of claim 13.

21. A method of treating a gas, comprising:
removing a substance from a gas with the sintered product of claim 13 carrying a catalyst.

22. A method of exchanging heat, comprising:
transferring thermal energy from a fluid that is at a first temperature to the sintered product of claim 13, and later transferring thermal energy transferred to the sintered product to a fluid that is at a temperature lower than the first temperature.

23. A method of heating a fluid, comprising:
exposing a sintered product according to claim 13 to a fluid that is heated and transferring thermal energy from the fluid that is heated to the sintered product;
exposing the sintered product to the fluid after the fluid has cooled, to increase the temperature of the fluid that has cooled by transferring thermal energy, transferred to the sintered product by the fluid that is heated, from the sintered product to the fluid that has cooled.

24. A method of moulding a substance, comprising:
forming a substance in a mould, the mould including the sintered product of claim 13.

25. A method of forming glass, comprising:
forming glass in a mould, the mould including the sintered product of claim 13.

26. A Stirling engine, comprising:
a heat recuperator including the sintered product of claim 13, wherein the sintered product is adapted to exchange heat.

27. A Stirling engine, comprising:
a hot chamber;
a cold chamber; and
a sintered product according to claim 13;
wherein the Stirling engine is adapted to move a fluid from the hot chamber to the cold chamber while exposing the sintered product to the fluid to transfer thermal energy from the fluid to the sintered product; and wherein the Stirling engine is adapted to move the fluid from the hot chamber to the cold chamber while exposing the sintered product to the fluid to transfer thermal energy, transferred to the sintered product by the fluid, from the sintered product back to the fluid.

28. A Stirling engine according to claim 27, further comprising:
a passage fluidically between the hot chamber and the cold chamber;
wherein the sintered product is mounted in the passage; and
wherein the Stirling engine is adapted to move the fluid through the passage when transferring the fluid from the hot chamber to the cold chamber and when moving the fluid to the cold chamber from the hot chamber.

29. A ceramic or high temperature resistant glue, comprising a set of short metal fibers as in claim 1.

* * * * *